Dec. 22, 1942.  A. G. B. METCALF  2,306,073
PHOTOELECTRIC CONTROL OF HEATING EQUIPMENT
Filed Dec. 8, 1939   2 Sheets-Sheet 1
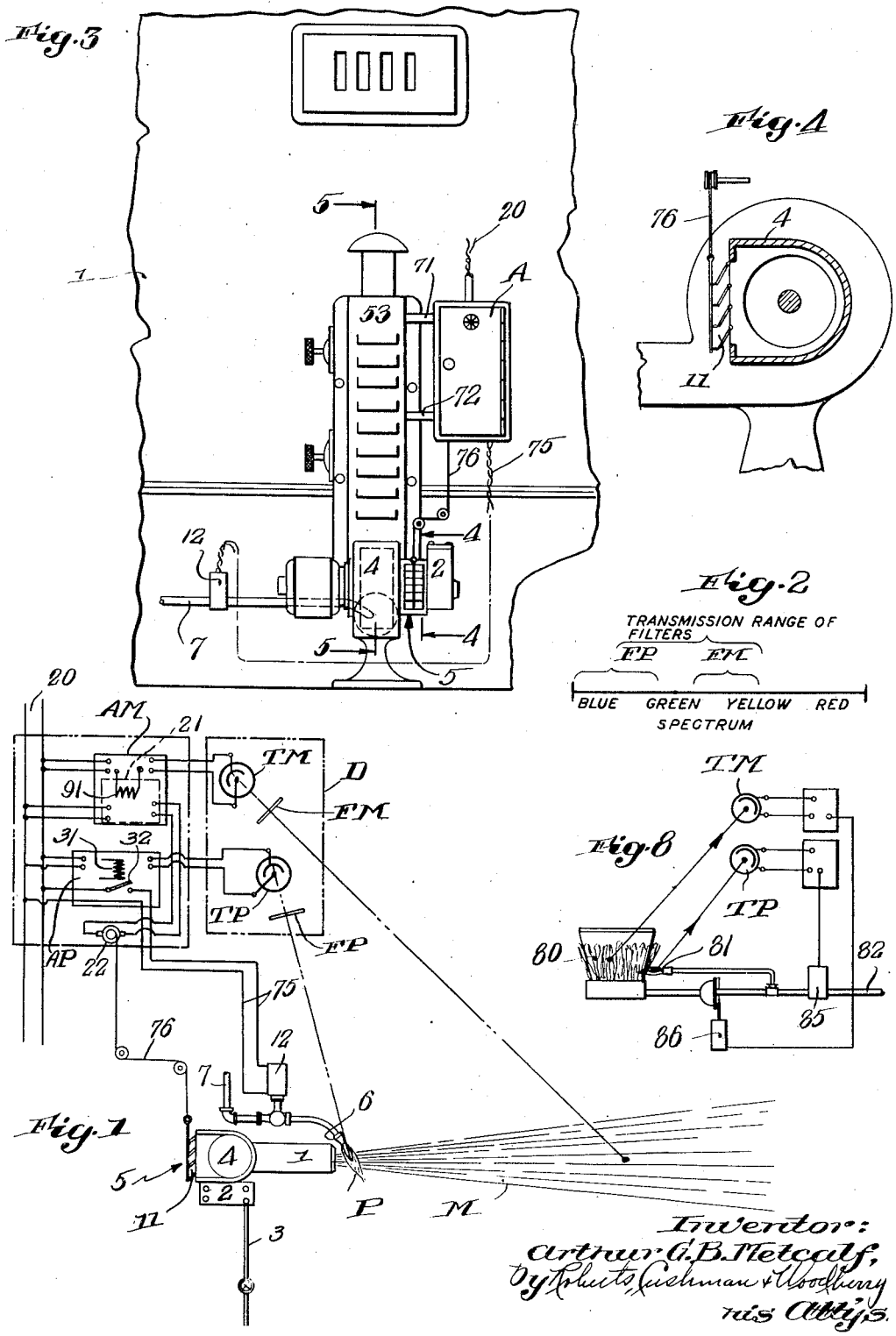
Inventor:
Arthur G. B. Metcalf,
by Roberts, Cushman & Woodberry
his Attys.

Dec. 22, 1942.   A. G. B. METCALF   2,306,073
PHOTOELECTRIC CONTROL OF HEATING EQUIPMENT
Filed Dec. 8, 1939   2 Sheets-Sheet 2
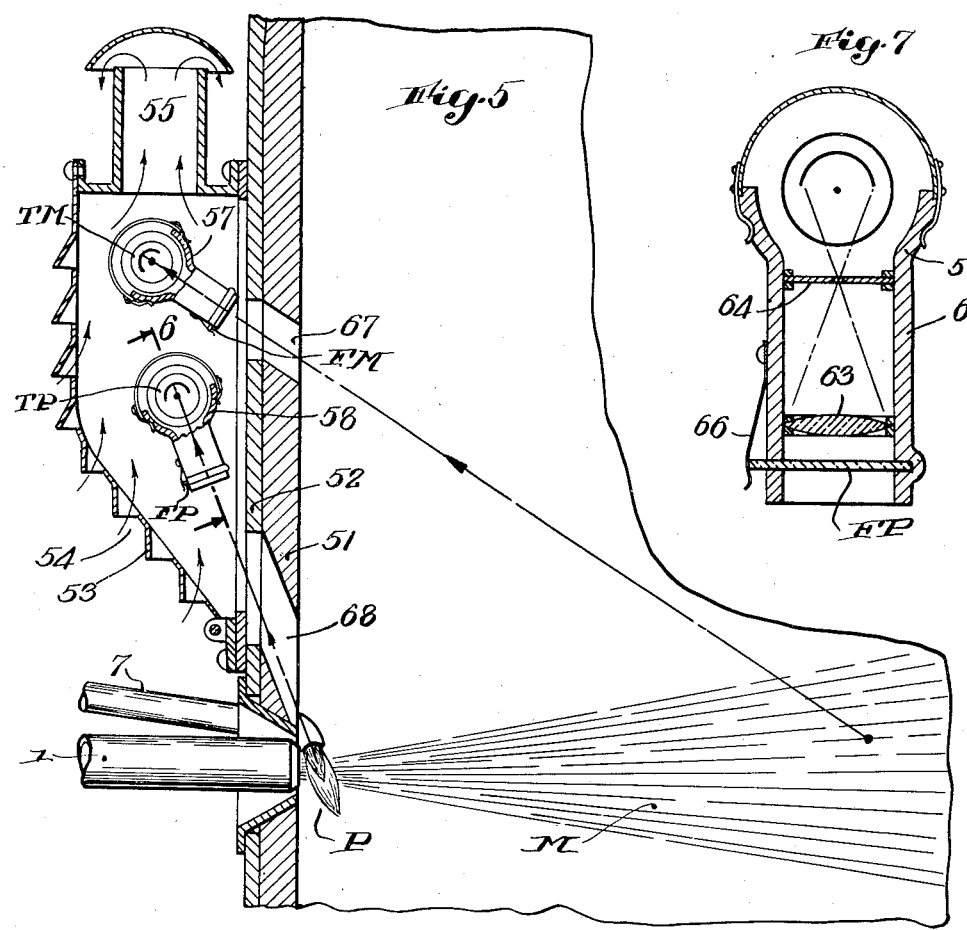
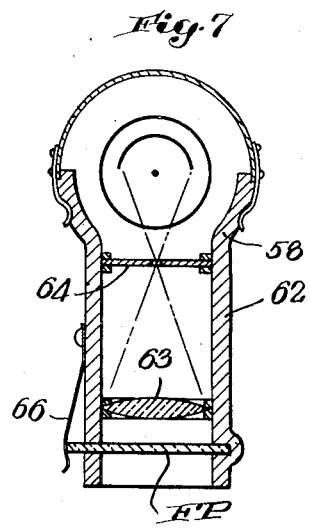
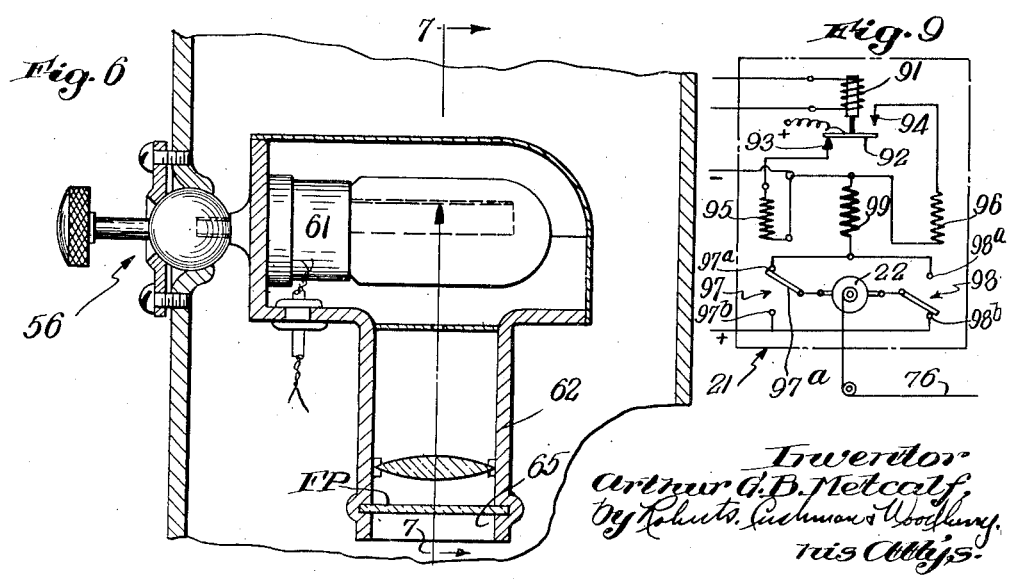

Patented Dec. 22, 1942

2,306,073

UNITED STATES PATENT OFFICE 2,306,073

PHOTOELECTRIC CONTROL OF HEATING EQUIPMENT

Arthur G. B. Metcalf, Milton, Mass., assignor to Photoswitch Incorporated, Cambridge, Mass., a corporation of Massachusetts Application December 8, 1939, Serial No. 308,207

14 Claims. (Cl. 158—28)

This invention relates to the control of heating equipment by way of distinguishing between different spectral ranges of the radiation emitted by the heating elements.

It has been heretofore proposed to detect the condition of one of several juxtaposed heating elements directly, for example by introducing a heat-conducting rod into a flame; such devices, however, can not always exactly distinguish the elements nor detect the condition of an element with sufficient exactness and, because they involve mechanical structures extending from delicate control elements directly into the heating zones, they are not absolutely reliable under all conditions. It has also been proposed to supervise heating elements with the aid of photoelectric devices, but such arrangements are based on the detection of intensities of radiated energy without discriminating between spectral ranges of the radiation, and therefore unsatisfactory if an operation to be supervised depends upon the correlation of emissions in different ranges.

It is one of the main objects of the present invention to provide a method of, and reliable means for supervising correlated heating elements, as for example pilot flame and heating flame proper, in response to changes of the spectral range of the radiation emitted by such elements. Other objects are to regulate the fuel mixture supplied to a burner dependent upon the color temperature of its flame; to cut off the fuel supply to a pilot flame or a main flame upon extinction of the pilot; to supervise simultaneously burning flames by distinguishing them through differences in color; to provide a system for controlling fuel supply to related heating elements by differentially detecting their condition as indicated by radiation therefrom, with the aid of light response means as photoelectric tubes actuating an electric control arrangement; to provide rugged, reliable and yet sensitive and inexpensive apparatus for differentially supervising the operation of interrelated burners and to control such operation of a burner dependent on its condition or on the condition of the other burner; to provide a heating system with main and pilot burners which detects the combustion conditions of the main flame independently of an adjacent pilot flame and regulates it accordingly, and which controls the fuel supply to the pilot or the main flame, or both, independently of the condition of the main flame; and to provide photoelectric equipment distinguishing between and controlling accordingly the condition of two flames burning with different color, by equipment simultaneously but independently responsive to light of different color.

These and other objects, aspects and features will be apparent from the following description illustrating the genus of the invention with reference to several embodiments thereof; the description refers to drawings in which:

Fig. 1 is a diagrammatical view of heating apparatus controlled according to the invention;

Fig. 2 is a diagram illustrating the radiation ranges effective in an arrangement according to Fig. 1;

Fig. 3 is a front elevation of equipment according to Fig. 1;

Fig. 4 is a section on lines 4—4 of Fig. 3;

Fig. 5 is a section on lines 5—5 of Fig. 3;

Fig. 6 is a section on lines 6—6 of Fig. 5;

Fig. 7 is a section on lines 7—7 of Fig. 6;

Fig. 8 is a diagram similar to Fig. 1, of another embodiment of the invention; and Fig. 9 is a detail circuit diagram of the main heater control of Fig. 1.

Fig. 1 shows an oil burner of the type used for larger installations as for example heating plants in apartment houses or hot water supply systems in manufacturing plants. Burner 1 is equipped with fuel pump 2 fed from oil line 3 and with a blower 4 with air intake 5. A pilot burner 6 whose flame P is arranged for igniting the main flame M is supplied with gas through gas pipe 7.

The air intake 5 of blower 4 is equipped with louvres 11 permitting regulating of the mixture of oil and air burning as flame M. Gas line 7 of pilot burner 6 is equipped with an electromagnetically operated shut off valve 12.

Under normal operating conditions, pilot flame P will burn with a very hot blue flame, while visible radiation of the effective portion of the main flame M will be mainly in the yellow to orange range of the visible spectrum.

In order to provide ignition with certainty, the pilot flame must be very hot, which is permissible since this flame is not so large that it could cause damage to the equipment; on the other hand, the main flame, if burning at very high color temperature, would be too hot for practical heater equipment. Since combustion at low color temperature is inefficient and otherwise undesirable, the fuel mixture must be regulated for combustion at an intermediate temperature which will usually correspond to visible radiation mainly, in the above-mentioned yellow to orange spectral range although, of course, the most efficient range will vary somewhat according to prevailing conditions, as the purpose and nature of the heating equipment and the quality of the fuel.

Mounted on the furnace structure are two photoelectric tubes TP, TM in such a manner that light from the pilot flame P can reach tube TP and light from the main flame M can reach tube TM, although it does not necessarily matter if light from P reaches TM and light from M reaches TP. Tube TP is sensitive for blue light, for example it may be a tube of the potassium type, and tube TM is preferably sensitive for yellow to green, for example of the caesium type. Although the two tubes should be mainly sensitive for two different spectral ranges, they may be sensitive to light of wave lengths outside the respective ranges, since the latter can be excluded by suitable filters FP and FM, indicated in Fig. 1. In the present instance, blue sensitive tube TP will have a blue transmitting filter FP, and yellow sensitive tube TM a yellow to green transmitting filter FM. Filters having the properties of Wratten filters No. 47a and No. 61, respectively, for example, will be suitable for this purpose.

Fig. 2 indicates the approximate transmission ranges of the filters determining the ranges of effective sensitivity of the photo tubes in the present instance. It will be understood that different ranges will be selected if the effective normal radiation ranges of the heating elements to be supervised are in other portions of the spectrum, including its invisible ranges.

The current produced by the photo tubes upon illumination thereof is amplified for example by means of equipment described in Patent No. 2,154,480, dated March 18, 1939, and indicated at AP and AM of Fig. 1. The current from amplifier AM may be employed to actuate the movable element of a continuous control relay, as indicated at 21 of Fig. 1 (explained more in detail with reference to Fig. 9) and actuating a motor 22 proportional to changes of the amplified current which again is proportional to variations of the light flux reaching the photo tube. Motor 22 operates louvre 11 of air intake 5. The current output of amplifier AP may operate a relay switch indicated by solenoid 31 and circuit maker 32 which latter is in a relay circuit including the control magnet of valve 12. The relay circuits and amplifying devices may be supplied from line 20.

As shown in Fig. 9, a solenoid 91 supplied with amplified current controlled by tube TM actuates a switch 92 making contact either at 93 or 94 depending upon the strength of the current supplied to solenoid 91. Contacts 93 and 94 energize magnets 95 and 96, respectively, which again control switches 97 and 98, respectively, in the circuit of motor 22 with exciter winding 99. The position shown corresponds to abnormally low current in 91 permitting armature 92 (connected to one side of the line) to drop and to close at 93 the energizing circuit for magnet 95 which will move switch 97 from 97b to make contact at 97a and close the supply circuit for motor 22 through normally closed contact 98b of switch 98. The motor will begin to run and actuate louvre 11 for example in the sense effective to supply more air. If the current controlled by tube TM becomes abnormally high, contact is established at 94 and the motor runs in opposite directions in order to reduce the air supply. If tube TM detects a normal amount of radiation, switch 92 will be in intermediate position and the louvre is at rest.

With the photocells and filters selected as above described, amplifier AM and relay 21 can be so dimensioned, connected and set that louvres 5 are more or less opened or closed dependent upon the color of flame M. If, for example, this flame becomes too red indicating incomplete combination, the intensity of the light admitted through filter FM will decrease, the output of AM will likewise decrease, and motor 22 will cause more air to be supplied, as described above.

If the radiation of M moves towards the blue region of the spectrum, the intensity of the light transmitted through FM will increase, and the air supply reduced. It will be noted that the transmission range of filter FM is somewhat shifted from the normal emission range of flame M towards the blue; this has the purpose of obtaining a slanting characteristic of the relation between photo tube impedance and ratio between air and fuel supply as affecting the spectral range of the flame emission.

It will be understood that well known control equipment of more elaborate construction than that shown in Fig. 9 and for example including anti-hunting devices may be used. Devices of this kind are well known and not part of the present invention; any arrangement will be suitable which regulates the air supply at 5 to maintain a main flame M emitting radiation indicative of optimum combustion for the purpose at hand through a photo tube sensitive to a selected spectral range.

Amplifier AP, responsive to photo tube TP which supervises the pilot flame, is arranged to keep switch 32 open as long as the pilot burns; as soon as this blue flame is extinguished, the impedance of the photo tube TP is substantially increased, which causes switch 32 to be closed. The gas supply to burner 6 is thereupon cut off at 12, preventing possible damage to the system.

Referring now to Figs. 3 to 7, a practical construction of apparatus according to the invention will be described.

In these figures, 51 is a boiler or furnace wall having openings for the main and pilot burners 1 and 6, respectively (Fig. 5). Fastened to wall 51 and preferably separated therefrom by heat insulation gasket 52 is a photo tube housing 53 having ventilation slots 54 and a chimney 55. Fastened to housing 53, preferably by means of a ball and socket mount 56 (Fig. 6) are photo tube housings 57, 58 having sockets 61 for receiving a photo tube (Fig. 6). The housings have hood portions 62 which may contain a lens 63 with diaphragm 64 forming in well known manner a light hood excluding marginal light. Hood portion 62 further supports a filter F inserted in grooves 65 and held in place by spring 66. By means of the ball and socket joint, the photo tube can be aimed at the pilot and main flames through openings 67 and 68, respectively, in order to select points where radiation is most favorable for purposes of the invention. It will be evident that the photo tubes may be differently mounted, but the above-described arrangement provides for proper cooling and protection of the photo tubes in an installation of the type described. As shown in Fig. 3, the wires from the photo tube may be led through conduits 71 and 72 to a box A containing the amplifiers and control apparatus supplied with current at 20. The wires from relay 32 (Fig. 1) to the pilot valve 12 are indicated at 75. Motor 22 is preferably arranged in box A and its driving connection to louvres 11 is indicated in Figs. 3 and 4, where 4 is the blower housing and 76 the control chain leading from motor 23 to louvres 11.

As indicated above, valve 12 is retained open during normal operation, that is as long as tube TP receives sufficient light through filter FP to keep switch 32 in normal position. As soon as pilot flame P is extinguished, valve 12 cuts off the fuel supply. Main flame M is supplied with optimum mixture as above described.

As indicated in Fig. 8, one photo tube may be used to control a flame supervised by the other tube. In this instance, a gas burner 80 and a pilot 81 are supplied from gas conduit 82. Photo tube TP controls 85 similar to valve 12 of Fig. 1 which cuts off the gas supply to both burners if the pilot goes out. Tube TM again supervises the main flame and regulates, at 86, its mixture, by means of a conventional mixer analogous to inlet 5 of Figs. 1 and 3. The amplifying and control translating devices are again indicated at AP and AM and do not require detailed explanation.

It will be understood that the principle of the invention can be applied to heating elements of various types, with radiation ranges other than those above referred to by way of example, and that the means of regulating or controlling such elements may vary accordingly.

It should be understood that the present disclosure is for the purpose of illustration only and that this invention includes all modifications and equivalents which fall within the scope of the appended claims.

I claim:

1. Apparatus for controlling the energy supply to heating means including as juxtaposed units a burner and an igniter for said burner, said units normally radiating light with the respective intensity maxima in two different spectral ranges, comprising means for supplying said heating means with heating energy whose variation may cause said maxima to change, light responsive means, means for rendering said light responsive means mainly sensitive to light of one of said ranges, and means operated by said light responsive means for controlling the heating energy supply to a selected one of said units in response to change of the maximum of said range.

2. Apparatus for controlling the energy supply to heating means including as juxtaposed units a burner and an igniter for said burner, said units normally radiating light with the respective intensity maxima in two different spectral ranges, comprising means for supplying said heating means with heating energy whose variation may cause said maxima to change, light responsive means, means for rendering said light responsive means mainly sensitive to light of one of said ranges, and means operated by said light responsive means for controlling the heating energy supply to the unit radiating the other range in response to variations of light radiation within said first range.

3. Apparatus for controlling the energy supply to heating means including as juxtaposed units a burner and an igniter for said burner, said units normally radiating light with the respective intensity maxima in two different spectral ranges, comprising means for supplying said heating means with heating energy whose variations may cause said maxima to change, light responsive means, means for rendering said light responsive means mainly sensitive to light of one of said ranges, and means operated by said light responsive means for controlling the heating energy supply to the unit radiating said range in response to variations of light radiation within said range.

4. Apparatus for controlling the energy supply to heating means including as juxtaposed units a burner and an igniter for said burner, said units normally radiating light with the respective intensity maxima in two different spectral ranges, comprising means for supplying said heating means with heating energy whose variation may cause said maxima to move, two light responsive means, means for rendering said light responsive means mainly sensitive to light of said ranges, respectively, and means for each one of said units operated by respective ones of said light responsive means for controlling the heating energy supply to said units in response to variations of light radiation within said ranges.

5. Heating apparatus comprising a pilot normally emitting light mainly of a certain spectral range, a burner arranged for ignition by said pilot and normally emitting light mainly of a second spectral range, means supplying fuel to said pilot, photoelectric means mainly responsive to light of said first range and hence substantially unaffected by said emission from said burner, and means controlled by said photoelectric means for stopping said fuel supply to said pilot upon extinction thereof.

6. Heating apparatus comprising a pilot normally emitting light mainly of a certain spectral range, a burner arranged for ignition by said pilot and normally emitting light mainly of a second spectral range, means supplying fuel to said pilot, photoelectric means mainly responsive to light of said first range and hence substantially unaffected by said emission from said burner, and means controlled by said electric means for stopping said fuel supply to said pilot upon decrease of the light emission of said first range below a certain intensity.

7. Heating apparatus comprising a pilot normally emitting light mainly of a certain spectral range, a burner arranged for ignition by said pilot and normally emitting light mainly of a second spectral range, means supplying fuel and air to said burner, photoelectric means mainly responsive to said second range and hence substantially unaffected by said emission from said pilot, and means controlled by said photoelectric means for controlling the mixture of fuel and air supplied to said burner depending only upon the emission therefrom within said second range.

8. Heating apparatus comprising a pilot normally emitting light mainly of a certain spectral range, a burner arranged for ignition by said pilot and normally emitting light mainly of a second spectral range, means supplying fuel to said pilot, means supplying fuel and air to said burner, photoelectric means mainly responsive to said first range and hence substantially unaffected by said emission from said burner, a second photoelectric means mainly responsive to said second range and hence substantially unaffected by said emission from said pilot, means controlled by said first photoelectric means for stopping fuel supply to said pilot upon extinction thereof, and means controlled by said second photoelectric means for controlling the mixture of fuel and air supplied to said burner depending only upon the emission from the burner within said second range.

9. Heating apparatus comprising a pilot normally emitting mainly blue light, a burner arranged for ignition by said pilot and normally emitting mainly yellow light, means supplying fuel to said pilot, means supplying fuel and air to said burner, photoelectric means responsive to blue light and hence substantially unaffected by said emission from said burner, a second photoelectric means mainly responsive to yellow light and hence substantially unaffected by said emission from said pilot, means controlled by said first photoelectric means for stopping fuel supply to said pilot upon decrease of the blue light emission therefrom below a certain intensity, and means controlled by said second photoelectric means for controlling the mixture of fuel and air supplied to said burner depending upon the change of yellow emission from the burner.

10. Heating apparatus comprising a pilot normally emitting light mainly of a certain spectral range, a burner arranged for ignition by said pilot and a normally emitting light mainly of a second spectral range, means supplying fuel to said burner, photoelectric means mainly responsive to said first range and hence substantially unaffected by said emission from said burner, and means controlled by said photoelectric means for stopping fuel supply to said burner upon decrease of the light emission of said first range below a certain intensity.

11. Heating apparatus comprising a pilot normally emitting light mainly of a certain spectral range, a burner arranged for ignition by said pilot and normally emitting light mainly of a second spectral range, means supplying fuel to said pilot, means supplying fuel and air to said burner, photoelectric means mainly responsive to said first range and hence substantially unaffected by said emission from said burner, photoelectric means mainly responsive to said second range and hence substantially unaffected by said emission from said pilot, means controlled by said first photoelectric means for stopping fuel supply to said pilot and said burner upon decrease of the light emission of said first range below a certain intensity, and means controlled by said second photoelectric means for adjusting the mixture of fuel and air supplied to said burner, in accordance with the emission in said second range.

12. Apparatus for controlling the energy supply of heating means including as juxtaposed units a burner and an igniter for said burner which normally emit radiation of different spectral ranges, comprising two detecting means responsive substantially only to radiation within the spectral ranges normally emitted by said burner and said igniter, respectively, means for supplying said heating means with energy the variation of which causes intensity variations of said radiation, and means operated by said detecting means for controlling the energy supply of at least one of said units.

13. Apparatus for controlling the energy supply of heating means including as juxtaposed units a burner and an igniter for said burner which normally emit radiation of different spectral ranges, comprising detecting means responsive substantially only to radiation within the spectral ranges normally emitted by a selected one of said units, means for supplying said heating means with energy whose variation causes intensity variation of said radiation, and means operated by said detecting means for controlling a selected one of said components.

14. Apparatus for controlling the energy supply of heating means including as juxtaposed units a burner and an igniter for said burner which normally emit radiation of different spectral ranges, comprising detecting means responsive substantially only to radiation within the spectral ranges normally emitted by a selected one of said units, means for supplying said heating means with energy the variation of which causes intensity variation of said radiation, and means operated by said detecting means for controlling the energy supply of the other one of said units.

ARTHUR G. B. METCALF.